March 12, 1946. J. D. TOFT 2,396,305
FISH DISCHARGING APPARATUS
Filed Oct. 7, 1943 2 Sheets-Sheet 1
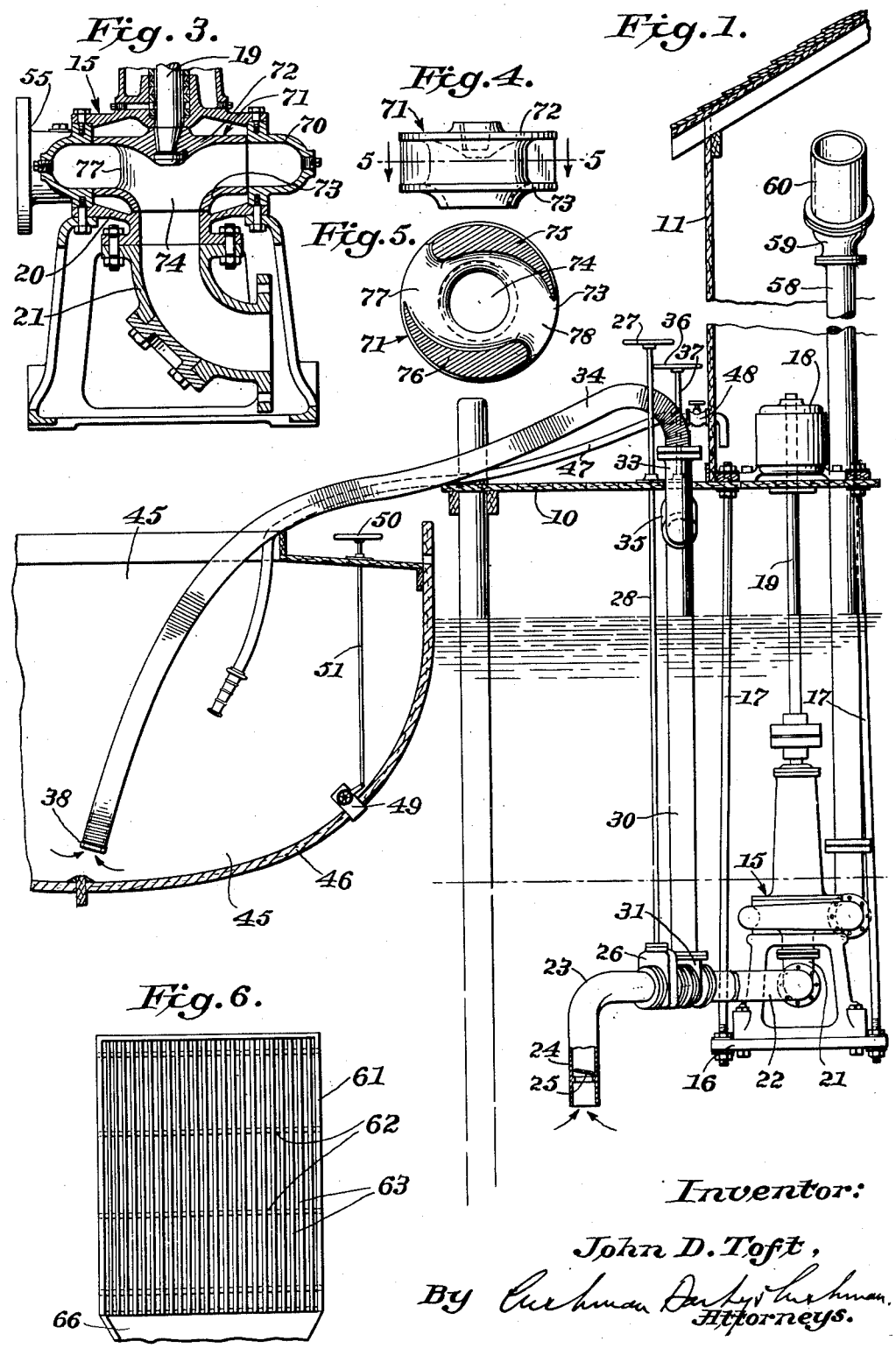
Inventor:
John D. Toft,
By Cushman Darby Cushman
Attorneys.

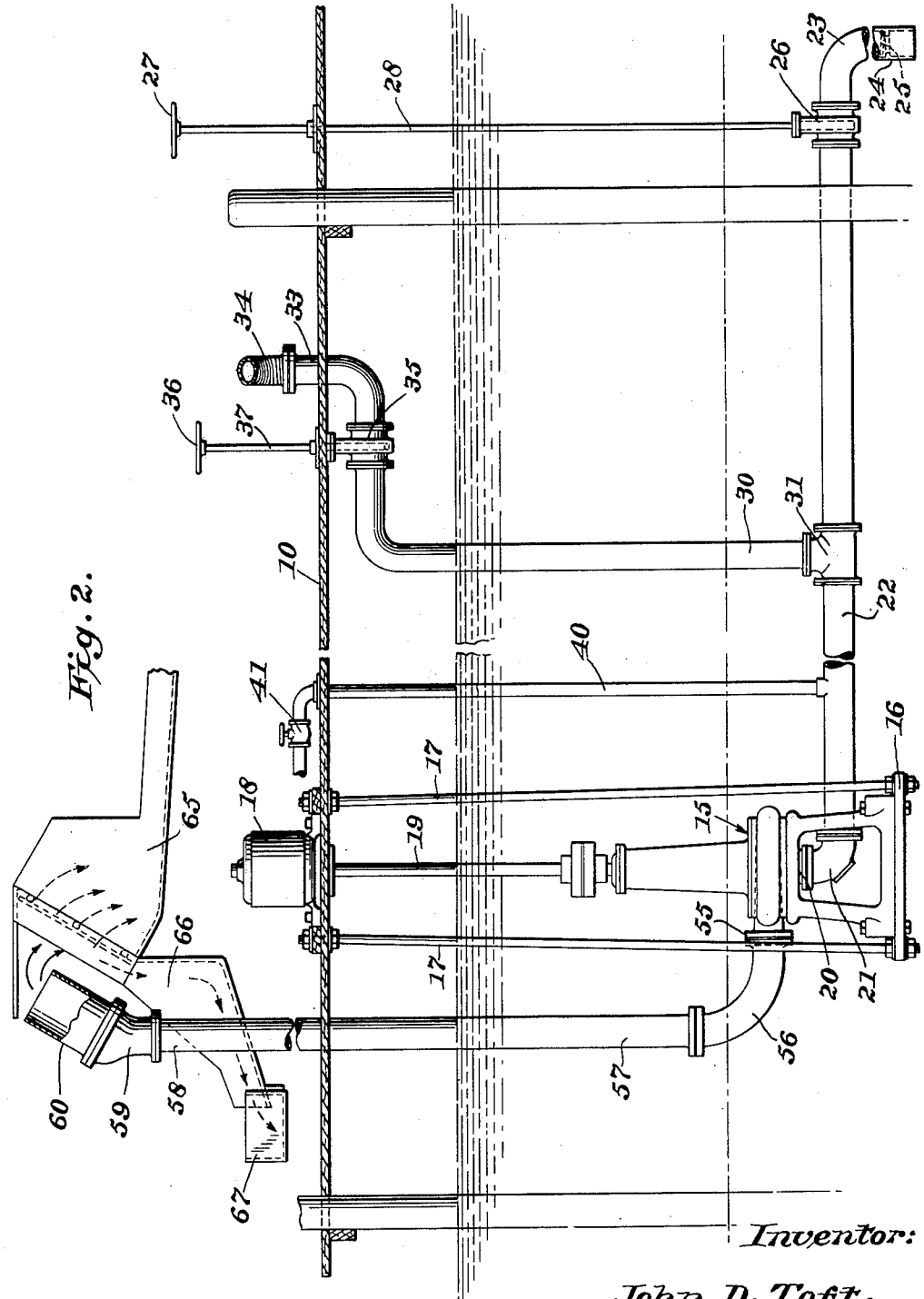

Patented Mar. 12, 1946

2,396,305

UNITED STATES PATENT OFFICE 2,396,305

FISH DISCHARGING APPARATUS

John D. Toft, South Portland, Maine

Application October 7, 1943, Serial No. 505,397

13 Claims. (Cl. 214—14)

This invention relates to a method of and apparatus for discharging fish in bulk from a vessel, such as a vessel of the type used to transport fish from the areas where they are caught in large numbers in nets to a fish packing house, cannery or the like.

For many years, it has been the practice for such boats to collect fish from the fishing gangs, and to bring them to the dock of the packing or canning house. The boats have been unloaded in the past by manual labor and mechanical hoisting devices, by a procedure in accordance with which the workmen manually shoveled or scooped the fish in the hold of a vessel, by the use of scoop nets, into large hoisting nets, lowered into the hold. When filled, the hoisting nets would be raised and their contents dumped into appropriate tanks or conveying devices. Such a procedure is extremely laborious and quite slow. The large number of handlings to which the fish are subjected results in considerable damage to the fish and a consequent loss of a substantial percentage of the catch. Moreover, there it often happens that a portion of the fish will be lost through spoilage, because of the length of time required to unload a vessel. In the past, it has been common to require the services of four men working from six to eight hours to unload a sixty-five ton vessel. It will be readily appreciated that the expense of this operation is quite substantial, and that the results have not been satisfactory, because of the time involved, the damage to the fish and the likelihood of spoilage. Moreover, during the entire time that the ship is being unloaded, it is out of commission and cannot be employed to travel to or return from the fishing areas.

The primary object of the present invention is to eliminate all of the disadvantages of the prior practices in the unloading of fish from such vessels and to provide a method of and means for quickly, efficiently and expeditiously unloading the fish, without damaging them and without running any danger of spoilage.

A further object of the invention is to unload the cargo of a fish transporting vessel by hydraulic means, so that the fish are caused to flow in a stream of water from the ship's hold to a discharge point in the packing house or cannery, where the fish are separated from the water and conveyed to storage and refrigerating tanks or to some other processing station.

A further object of the invention is to provide a hydraulic system for unloading fish from a vessel which handles the fish in such a manner that they are not mutilated or damaged to the slightest extent. To this end, the invention provides means for accurately controlling the proportion of fish and water flowing in the stream, so that the fish may flow through the apparatus in a dispersed condition, in the water as a carrier, and without making damaging contact with metallic parts of the apparatus, such as the pump and conduit surfaces, and without clogging the apparatus.

A further object of the invention is to provide means for separating the fish from the flowing stream of water, without subjecting the fish to violent impact against screening devices or the like. In this connection, the invention provides means for reducing the speed of movement of the fish and water, prior to their impact against the separating means, with the result that the fish strike the separating means relatively gently and are not injured thereby.

A further object is to provide improved separating means, in the form of a screen against which the fish may fall and along which they may slide, without damage to the fish.

Another important object of the invention is to provide, in combination with fish conveying and handling apparatus, means for effectively removing scales from the fish, without damaging the fish. In this connection, the invention of the present application serves to remove the scales from the fish by soaking action and by gentle agitation of the fish in large volumes of water in the flowing stream. Moreover, a large proportion of the scales are separated from the fish, before the fish are conveyed to storage tanks and flaking tanks, with the result that the tanks do not accumulate excessive amounts of scales. Hence, the tanks need be emptied and cleaned far less frequently than with formerly used fish handling methods and apparatus, which have substantially no fish scaling abilities.

Other and further objects and advantages of the present invention will be apparent to those skilled in the art from a consideration of the following description of an illustrative embodiment of the invention shown somewhat diagrammatically in the accompanying drawings and described below.

In the drawings,

Figure 1 is an end elevation, partly in section showing, somewhat diagrammatically, an apparatus in accordance with the invention.

Figure 2 is a similar side elevation, taken from the left of Figure 1.

Figure 3 is a vertical section of a suitable pump which may be employed in the combination of the invention.

Figures 4 and 5 are, respectively, a side elevation and a sectional plan of the impeller used in this type of pump, and Figure 6 is an elevation of a suitable screen for separating the fish and water.

The apparatus of the invention is shown in the accompanying drawings in association with a dock 10 of a fish cannery or other building, a portion of which is indicated at 11. The manner in which the various parts are positioned with respect to the dock and cannery building is purely diagrammatic, and the invention is, in no sense, limited to the arrangement shown.

A relatively large capacity, low pressure centrifugal pump 15 may be supported upon a platform 16, suspended by supporting means 17 from the dock 10, or upon a platform supported by the floor of the sea. The pump may be driven by an electric motor 18 through a shaft 19 or by any equivalent means. The pump inlet 20 is connected through an elbow 21 to a horizontally extending conduit 22 of relatively large size, such as a 10 or 12 inch pipe. This conduit terminates at its remote end 23 in a down-turned section 24, having an upwardly opening check valve 25 therein. An adjustable gate valve 26, positioned behind the check valve may be controlled by a vertically extending, rotatable shaft 28 having a hand wheel 27 on its upper end. Since such valves are well known in the art, it is unnecessary to describe their details of construction, and the representation thereof in the accompanying drawings is purely diagrammatic.

Between the valve 26 and the pump 15, and at a point spaced a substantial distance from the pump, there is a branch conduit 30, connected to the conduit 22 by a T-joint 31. A standpipe 33, connected to the upper end of the branch pipe 30 and supported in any suitable manner upon the dock 10, carries one end of a large flexible suction hose 34. Preferably, the pipe 30 and the hose 34 are of smaller diameter than the pipe 22, for instance, in the neighborhood of 8 or 10 inches, respectively, if a 10 or 12 inch pipe is at 22 used on the inlet side of the pump.

At some suitable point in the conduit 30 between the standpipe 33 and the pipe 22, there is an adjustable gate valve 35, adapted to be controlled by a hand wheel 36, through a rotatable shaft 37 or the like.

A second branch pipe 40 of relatively small diameter leading from a source of water under pressure may be connected to the pipe 22 and controlled by a valve 41 for the introduction of water into the system to prime the pump 15 at the commencement of an operation, if priming is necessary.

The flexible suction pipe 34 is of substantial length and, as shown in Figure 1, its free end 38 is adapted to be lowered into the hold 45 of a fishing vessel 46, tied to the dock 10.

Means are provided for adding substantial volumes of water to the fish in the hold of the vessel. For this purpose, one or more hoses 47, connected to a source of water under pressure by a valve 48 may be employed, or a seacock 49 in the hull of the vessel may be used, the latter being controlled by any appropriate means, such as a hand wheel 50 and a shaft 51.

The discharge 55 of the pump 15 is connected through an elbow 56 to a vertically extending pipe 57 of such length that its upper end 58 is preferably located on the second story of the packing house or cannery 11. At this point, means for separating the fish from the water are provided. Since the volume of water and fish delivered by the pump 15 is quite substantial, the velocity of the upwardly flowing stream in the pipe 57 is high, and it has been found to be of vital importance to reduce the speed of movement of fish before they are discharged upon the separating means, in order to prevent mutilation of the fish. In the embodiment illustrated in the accompanying drawings, the pipe 57 at its upper end supports an angularly disposed pipe section 60 of enlarged diameter, such as 12 or 14 inches, if the pipe 57 is of 10 or 12 inch diameter. When the stream of water and fish enter this enlarged terminal section, their velocity is reduced to the desired extent, and they flow quite gently upon the separating means positioned adjacent thereto.

The screen which serves to separate the fish from the flowing stream of water preferably comprises a frame 61 of rectangular form supported in a rearwardly inclined position, facing the discharge pipe. A plurality of horizontal bars 62, spaced a substantial distance apart and secured at their ends in the frame 61, carry a great plurality of relatively small rods 63, welded to the front face thereof, in closely spaced relation and disposed in vertical planes. In the preferred embodiment of the invention, the rod or bars 63 are smooth, round welding electrode rods of substantially three-sixteenths inch diameter, spaced apart a distance of substantially three-sixteenths of an inch. Rods of this type are admirably suited for the screen, since they have sufficient strength, present a smooth surface to the fish, are not corroded by sea water, and may be easily welded to the supporting bars.

It has been found that conventional screens are entirely unsuited for the work involved in separating fish from a flowing stream of sea water, since the rough surfaces of reticulated or expanded metal screens damage the fish thrown against them, and small fish and foreign bodies in the stream tend to clog the openings thereof. With a screen of the type described herein, however, the elongated slots of narrow width permit the passage of water and discard small fish or trash, with the result that the screen is substantially completely non-clogging. Moreover, the smooth, vertically extending, parallel bars present an ideal sliding surface for the fish thrown thereagainst by the stream of water.

Behind the screen there is positioned a sluiceway or chute 65 for the water which passes through the screen, to convey the water to a point of discharge, such as the end of the dock. In front of the screen means are provided for conveying the fish to storage or to a processing station. Although any form of conveyor may be used, a sluiceway 66 has been found satisfactory. The fish and the water which does not pass through the screen flow downwardly through the sluiceway 66 to a transversely arranged chute or trough 67 which may extend along and above a plurality of storage tanks, into which the fish may be selectively discharged by the use of suitable gates and the like.

The use of a pump the type shown in Figures 3, 4 and 5, is of considerable importance in the present invention, since such a pump is effective to convey the fish, without mutilating or damaging them as they pass through the impeller chamber. Although pumps of this type are well known, their structure will be briefly described, since their use in the combination disclosed herein is thought to be entirely novel. The pump comprises a large volute casing 70, having an inlet 20, connected as previously described to an elbow 21 or the like. Within the casing is an impeller 71 having an upper imperforate head 72 connected to the motor shaft 19 and a lower head 73 having a large opening 74 therein aligned with the inlet 20. The heads are interconnected by and are cast integrally with vanes 75, 76, having large, relatively unrestricted discharge passages 77, 78 therebetween. It will be noted that the leading ends of the vanes are smooth, rounded and blunt, and that the trailing ends are rearwardly inclined and taper to a thin edge. It will be appreciated that there are substantially no surfaces which can mutilate the fish, since the fish flow axially into the impeller between the blades and laterally through the spaces 77, 78, into the large volute casing 70, from which they are conveyed by the flowing stream through the pipe 57.

It is thought that the operation of the apparatus of the present invention and the method of unloading fish from a vessel will be apparent from a consideration of the foregoing description. For the sake of clarity, however, the procedure will be briefly outlined.

When a vessel with a cargo of fish, such as herring, has arrived at the dock, the pump 15 is started, with the valve 26 open and the valve 35 closed. If necessary, the pump and the pipe 22 are filled with water for priming purposes by opening the valve 41. If the pump and the pipe 22 are submerged in the sea water, as preferred, priming is unnecessary, since the system is normally filled with water, but at extremely low tides or because of other low water conditions, it is sometimes necessary to prime the pump. Of course, when priming has been completed, the valve 41 is closed.

With the valves 26 and 35 positioned as described above, a solid stream of water will flow through the check valve 25, the conduit 22, the pump 15 and the discharge pipe 57. Before the valves are readjusted, a substantial volume of water is introduced into the fish in the hold of the ship, either by opening the seacock 49 or by the use of the hoses 47 or both. The hose 47 may be a conventional fire hose, equipped with a suitable nozzle to assist in washing down the fish from the sides and corners of the hold to the suction pipe, particularly during the last stages of the unloading operation.

When a sufficient body of water has been added to substantially immerse the fish and to displace any air that might otherwise be present in the spaces between the fish, the valve 35 is gradually opened and the valve 26 gradually partially closed. This results in a suction in the line 30 and the suction hose 34, with the result that the fish and the water in which they are immersed start to flow through the hose 34 and the pipe 30 to the T connection 31, at which point the fish join the stream of water flowing through the pipe 22 to the pump 15. The valves are further adjusted, to increase the rate of flow of the fish, while continuing the introduction of additional water into the stream through the conduit 22 under the control of valve 26. By properly adjusting these valves, as the operation continues, an extremely accurate proportioning or blending of fish and water flowing through the pipe may be effected, to the end that the fish are dispersed to the desired degree in the stream of water acting as a carrier. This dispersion of the fish in the water is important in preventing damage to the fish as they flow through the pipes and the pump. If the fish were closely packed in the flowing stream, they would force each other into contact with the pipe walls and into engagement with the impeller blades and the pump casing walls. By providing a relatively large body of free water around the fish, the fish are able to flow freely through the passageways, substantially out of contact with the metallic surfaces thereof. Thus, the proportioning of the water and fish in the flowing stream is of paramount importance in practicing the method of the present invention.

Although a pump of the type described above is substantially non-clogging, a concentrated stream of fish introduced into such a pump, would cause damage to the fish by the impeller, but when they are dispersed in a stream of water, to a controlled degree, in accordance with the present invention, they pass freely through the pump, without damage.

The fish in the stream of water flow upwardly through the pipe 57 from the volute casing of the pump, under the hydrostatic head produced by the centrifugal forces set up by the impeller. The flow of the stream is sufficiently rapid to maintain the fish in the desired dispersed condition. At the upper end of the discharge pipe, the stream enters the enlarged section 60, where its speed of movement is very substantially reduced so that, when the fish and water are discharged against the bars 63 of the screen, the fish are not damaged. From this point, the fish flow through the sluiceways, preferably to storage tanks containing a highly concentrated solution of refrigerated brine. From these tanks the fish may be transferred as desired to the usual flaking tanks.

It has been found in actual practice, with the use of the apparatus of the present invention, that the fish moving through the conduits in dispersed condition in large volumes of water, and through the pump, have a tendency to lose substantially all of their scales, without damaging the fish. The soaking and agitation of the fish in the water tend to loosen the scales and to remove them from the skin of the fish. The scales of such fish as herring are small and are not particularly firmly attached so that the soaking of the fish and the flowing and agitation of the fish in large volumes of water through the conduits and the pump tend to dislodge the scales, which scales flow with the stream and the fish to the discharge point. The scales are so small that they readily pass through the slots in the screen with the water, leaving the fish in substantially completely scaled condition to slide down the sluiceways and chutes to the brine tanks. The fish are transferred from the refrigerated brine in these tanks to the usual flaking tanks, where any scales not previously removed are deposited.

As illustrating the usual and unexpected fish scaling abilities of the apparatus of the present invention, it may be pointed out that, with conventional methods of unloading fish by hoists and the like, the flaking tanks collect two feet or more of scales in a predetermined time, while the same tanks collect less than two inches of scales in the same length of time, when the hydraulic fish handling system of the present invention is employed. This probably results from the fact that, with the old methods, the fish were handled in batches, with substantially no agitation in large volumes of water so that the scales were not soaked and removed prior to their delivery to the flaking tanks.

Although the invention has been described with considerable particularity, by reference to the embodiment shown in the drawings, it must be understood that it is not limited to the details of construction shown and described, but covers all modifications coming within the scope of the appended claims and their equivalents.

I claim:

1. Apparatus for unloading from a vessel or the like a mass of fish immersed in liquid, comprising a conduit supported independently of the vessel and having an end adapted to be immersed in the mass of fish and liquid, a centrifugal suction pump connected to said conduit and similarly supported, means for introducing additional liquid into said conduit between said end thereof and the pump to disperse the fish in the liquid conveyed through said conduit under the influence of the pump, to prevent damage to the fish by the pump and means for separating the liquid and the fish.

2. Apparatus for unloading from a vessel a mass of fish immersed in water therein, said apparatus being mounted on a dock or the like, independently of the vessel and comprising a conduit having an end adapted to be submerged in the mass of fish and water, a centrifugal suction pump connected to said conduit, and variable means between the first-mentioned end of the conduit and the pump for introducing into the conduit additional water to disperse the fish in the flowing stream of water drawn through the conduit by the pump, to prevent damage to the fish by the pump.

3. Apparatus for unloading fish from the hold of a vessel or the like, comprising a conduit supported independently of the vessel and having an end adapted to be immersed in a mass of fish and water therein, a centrifugal pump similarly supported and having its intake connected to said conduit, a second conduit leading from a source of water to the first conduit between said end thereof and the pump, valve means for controlling the capacity of the second conduit, whereby the proportion of fish and water flowing to the pump through the conduit may be controlled, a discharge conduit leading from the pump, and means for separating the water and fish discharged therefrom.

4. Apparatus associated with a dock or the like for unloading fish from a vessel, comprising a large capacity low pressure centrifugal pump supported independently of the vessel, a suction conduit leading from said pump to a substantially unlimited supply of water, a valve for controlling the amount of water admitted to the conduit from said unlimited supply, and a second conduit communicating with the first conduit at a point between the valve and the pump, said second conduit having an end adapted to be immersed in a mass of fish and water in the vessel, whereby the proportion of fish and water drawn through the conduit by said pump may be controlled by adjusting the valve.

5. Apparatus for unloading fish from the hold of a floating vessel, comprising a centrifugal pump supported independently of the vessel and submerged in the water in which the vessel is afloat, a similarly supported inlet conduit for the pump having its end submerged in said water, a valve for controlling the admission of water to said conduit, and a branch conduit having one end connected to the first-mentioned conduit between the pump and the valve and having an open end adapted to be immersed in a mass of fish and water in the hold of the vessel, whereby, upon manipulation of said valve, the proportion of fish and water flowing through the first-mentioned conduit to the pump may be controlled.

6. Apparatus for unloading from a vessel or the like a mass of fish immersed in water, comprising a large capacity centrifugal pump supported independently of the vessel, a conduit similarly supported, leading to the pump intake and having two inlet branches, one branch being in communication with a plentiful source of water and the other having flexible end section adapted to be immersed in the mass of fish and water in the vessel, whereby the pump draws unmixed water through the first branch and fish and water through the second, for union prior to their introduction into the pump, and valve means for controlling the volume of flow through the first branch conduit.

7. Apparatus for unloading from a vessel or the like a mass of fish immersed in water, comprising a large capacity centrifugal pump supported independently of the vessel, a conduit similarly supported, leading to the pump intake and having two inlet branches, one branch being in communication with the water in which the vessel is afloat and the other having an end adapted to be immersed in the mass of fish and water in the vessel, whereby the pump draws unmixed water through the first branch and fish and water through the second, for union prior to their introduction into the pump, valve means for controlling the volume of flow through each of said branch conduits, a discharge conduit leading from the pump, and an inclined screen facing the end thereof for separating the fish and the water.

8. An apparatus for unloading fish from a vessel or the like, comprising a large capacity low pressure centrifugal pump supported independently of said vessel, a conduit similarly supported, leading from the intake of the pump and having an end adapted to be immersed in a mass of fish and water in the vessel, a discharge conduit leading from the pump, whereby the fish and water are drawn through the first-mentioned conduit and the pump and are delivered through the discharge conduit, and means between said end of the first-mentioned conduit and the pump for introducing water for controlling the proportion of water and fish drawn into and through the pump to prevent clogging of the pump with fish or injury of the fish by the pump.

9. Apparatus for unloading fish from the hold of a vessel, comprising a large capacity low pressure centrifugal pump supported independently of the vessel and of the type having an open, substantially unobstructed impeller provided with blunt-ended, rearwardly tapered, streamlined vanes and a large volute casing, a conduit also supported independently of the vessel, connected at one end to the inlet of said pump and having its other end adapted to be immersed in a mass of fish and water in said vessel, a discharge conduit similarly supported leading from the pump, means adjacent the discharge end of the last-mentioned conduit for separating the discharged fish and water, and a branch conduit connected to the first-mentioned conduit between its ends for adding sufficient water to the fish flowing through the first-mentioned conduit to disperse the fish in said water as a carrier whereby the fish flow freely without mutilation through the impeller and casing of the pump.

10. Apparatus for unloading fish from the hold of a vessel, comprising a centrifugal pump supported independently of the vessel and of the type having a large volute casing with a central opening and an impeller of smaller diameter than the casing having an opening aligned with said inlet opening and relatively large laterally directed discharge passages defined by a pair of impeller vanes having blunt leading ends and rearwardly tapering streamlined trailing ends delivering to the volute casing, said apparatus further comprising a conduit connected at one end to the inlet of said casing and having a flexible section at its other end adapted to be immersed in a mass of fish and water in said vessel, and means between the ends of the conduit for adding water to the fish flowing therethrough to disperse the fish in the water as a carrier, whereby the fish flow freely without mutilation through the impeller and the casing of the pump.

11. Apparatus for unloading fish from the hold of a vessel, comprising a large capacity, low pressure centrifugal pump of the trash or sewage type supported independently of the vessel, a conduit having a flexible section leading from the supply of fish to the intake of the pump, means between the ends of the conduit for supplying additional water to the fish in said conduit to disperse the same for free passage through the pump, a discharge conduit leading upwardly from the pump, through which the fish and water are forced at a substantial velocity, a screen upon which the fish and water are discharged for separating the water from the fish, and means at the discharge end of the second conduit for reducing the velocity of the fish and water, whereby the fish are not damaged when they strike the screen.

12. Apparatus in accordance with claim 11 wherein the last-mentioned means comprises an angularly disposed pipe of substantially greater diameter than the discharge pipe, at the discharge end of the latter, and directed toward said screen.

13. Apparatus for unloading a cargo of fish from the hold of a vessel tied to a dock, comprising conduit means supported independently of the vessel and including a flexible section having one end fixed with respect to the dock and the other end supported for lowering movement into the hold of the vessel, fish and water separating means at an elevated position relative to the dock and supported thereby, a centrifugal pump supported by the dock and having its inlet connected to the fixed end of said conduit means, a discharge conduit similarly supported leading from the pump to the separating means, and means for introducing water into said conduit means between the ends thereof for controlling the proportion of water and fish delivered to the pump, to disperse the fish in the water as a carrier and to prevent mutilation of the fish by the pump.

JOHN D. TOFT.